(12) United States Patent
Fish et al.

(10) Patent No.: US 6,401,201 B2
(45) Date of Patent: *Jun. 4, 2002

(54) ARRANGEMENTS OFFERING FIRMWARE SUPPORT FOR DIFFERENT INPUT/OUTPUT (I/O) TYPES

(75) Inventors: Andrew J. Fish; Yan Li, both of Olympia, WA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/223,808

(22) Filed: Dec. 31, 1998

(51) Int. Cl.$^7$ ............................................. G06F 15/177
(52) U.S. Cl. ................................................... 713/2
(58) Field of Search .................. 707/104; 717/1, 717/6; 713/300, 1, 2; 710/261, 37, 8; 709/311

(56) References Cited

U.S. PATENT DOCUMENTS

| | | | | |
|---|---|---|---|---|
| 4,328,542 A | | 5/1982 | Anastas et al. | 711/163 |
| 5,313,584 A | * | 5/1994 | Tickner et al. | 710/37 |
| 5,604,905 A | * | 2/1997 | Tevanian et al. | 717/6 |
| 5,752,032 A | * | 5/1998 | Keller et al. | 709/311 |
| 5,805,902 A | * | 9/1998 | Kikinis et al. | 710/261 |
| 5,832,280 A | * | 11/1998 | Swanberg | 713/300 |
| 5,835,704 A | | 11/1998 | Li et al. | 714/42 |
| 5,835,775 A | * | 11/1998 | Washington et al. | 717/6 |
| 5,943,673 A | * | 8/1999 | Felouzis et al. | 707/104 |
| 5,958,049 A | * | 9/1999 | Mealey et al. | 713/1 |
| 6,065,067 A | * | 3/2000 | Hobson et al. | 710/8 |
| 6,049,668 A | * | 4/2000 | Smith et al. | 717/5 |
| 6,081,890 A | * | 6/2000 | Datta | 713/1 |

OTHER PUBLICATIONS

Harvey M. Deitel, An Introduction to Operating Systems, Addison–Wesley Publishing Company, Inc., First Edition, p. 5 (lines 15–19).*

* cited by examiner

Primary Examiner—Zarni Maung
Assistant Examiner—Jungwon Chang
(74) Attorney, Agent, or Firm—Antonelli, Terry, Stout Kraus, LLP

(57) ABSTRACT

The invention is a system, a method of operating the system and a method of customizing a processing system to operate with different input/output (I/O) systems. A system in accordance with the invention includes a processor, an I/O system coupled to the processor and system firmware, including a plurality of parts which each operate to perform system firmware functions required for and customized to only one of a plurality of different I/O systems which are operational when coupled to the processor, and a storage coupled to the processor, for storing identifying information which, when read, causes only one of the parts of the system firmware to be executed by the processor to perform the system firmware function necessary to operate the one of the different I/O systems identified by the identifying information.

27 Claims, 6 Drawing Sheets

ARRANGEMENTS OFFERING FIRMWARE SUPPORT FOR DIFFERENT INPUT/OUTPUT (I/O) TYPES

FIELD

The present invention relates to system firmware arrangements adaptable to diverse types of devices.

BACKGROUND

Firmware typically is hardware specific and must completely match hardware installed within a particular system. However, it has been found that, occasionally, there may be times where it is advantageous to change and/or add hardware within a system. Any change in hardware in the system typically requires a corresponding change of firmware. Previously, upgrading of firmware required obtaining and then physically replacing at least one semiconductor chip (i.e., firmware chip). Some newer systems have disk-loaded firmware that is somewhat easier/cheaper to upgrade (e.g., can be downloaded from the Internet). However, such updating procedures may still be too confusing and/or cumbersome to an average user.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure hereof this invention. While the foregoing and following written and illustrated disclosure focuses on disclosing example embodiments of the invention, it should be clearly understood that the same is by way of illustration and example only and is not to be taken by way of limitation, the spirit and scope of the present invention being limited only by the terms of the appended claims.

The following represents brief descriptions of the drawings, wherein.

DETAILED DESCRIPTION

Before beginning a detailed description of embodiments of the subject invention, mention of the following is in order. When appropriate, like reference numerals and characters are used to designate identical, corresponding or similar components in differing figure drawings. Further, in the detailed description to follow, although exemplary components are given, the present invention is not limited to the same. Next, known power connections and/or other connections (e.g., signal lines) are not shown within the Figs. for simplicity of illustration and discussion, as so as not to obscure the invention. Finally, while example embodiments of the present invention are described with respect to an input/output (I/O) arrangement and I/O devices, the present invention is not limited to use with such arrangements, and may be used in differing arrangements within a processing system.

Figure 1:
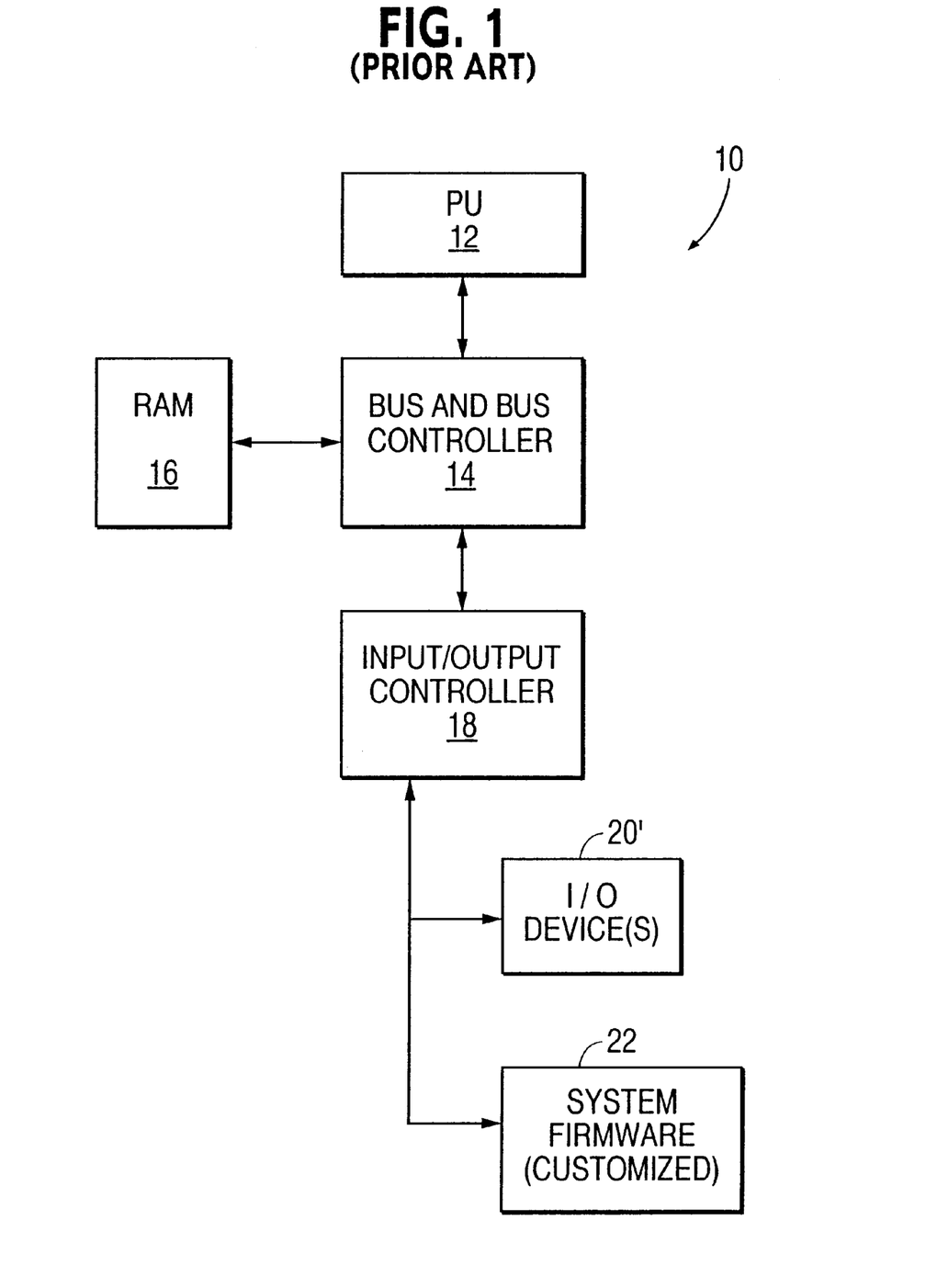
FIG. 1 illustrates an example block diagram of an example processing system useful for background discussions.

Turning now to detailed discussion, FIG. 1 illustrates an example block diagram of an example processing system 10, useful in describing background disadvantages before discussion of example embodiments of the invention. The example system includes a processor unit (PU) 12 which may be any processor, with such PU 12 being coupled to a bus and bus controller 14 of any design. Random access memory (RAM) 16 is coupled to the bus and bus controller 14. An I/O controller 18 is coupled to the bus and bus controller, and to at least one I/O device 20'. The system 10 includes system firmware 22 which is customized to control operations of the processing system and to work with the architectures of the processing system, e.g., bus and bus controller 14, I/O controller 18 and I/O device(s) 20'. While the firmware 22 in the FIG. 1 example embodiment is illustrated as being coupled to the I/O controller 18, such firmware may alternatively be coupled to any one of a plurality of other possible addressable locations in the system architecture. More particularly, the possible locations are any address in the address space of the system.

In the FIG. 1 example, the I/O controller 18 and I/O device(s) 20' may be provided in any one of a large number of diverse possible configurations. For example, in considering the possibilities of just the I/O device(s) 20' alone, a plurality of differing I/O device(s) 20' may be provided within a system, and at least some of the differing I/O device(s) 20' may be of differing I/O device types. For purposes of this disclosure, differing I/O device types will be each be generically referred to using alphabetical tags or designations, such as type A, type B . . . type N. However, embodiments of the present invention are not limited to alphabetical designation, e.g., embodiments of the present invention could just as easily be implemented using numeric and/or alpha-numeric tags or designations.

Firmware difficulties, such as accommodating differing types of I/O devices, are encountered at all equipment distribution levels. For example, original equipment manufacturers (OEMs) and/or equipment installers sometimes have difficulties obtaining and providing proper firmware which works properly with a particular system configuration (e.g., I/O devices). Such may create or magnify time-to-market (ttm) delays and/or installation delays. At the consumer level, newly purchased systems at first typically do not have a system firmware problem because newly purchased systems typically come with a predetermined hardware (e.g., I/O device) configuration, and have system firmware uniquely written (i.e., customized) to the predetermined hardware configuration. However, any hardware (e.g., I/O device) change or addition resulting in configuration modification may cause the system firmware to need to be correspondingly updated. As mentioned previously, updating of system firmware may be too expensive, too confusing and/or cumbersome to an average user, and often results in substantial problems/delays in getting a processing system to work properly again after even slight modification. All of the above problems/delays are at least inconvenient, and are more probably disruptive and costly, especially in a business environment.

Figure 2:
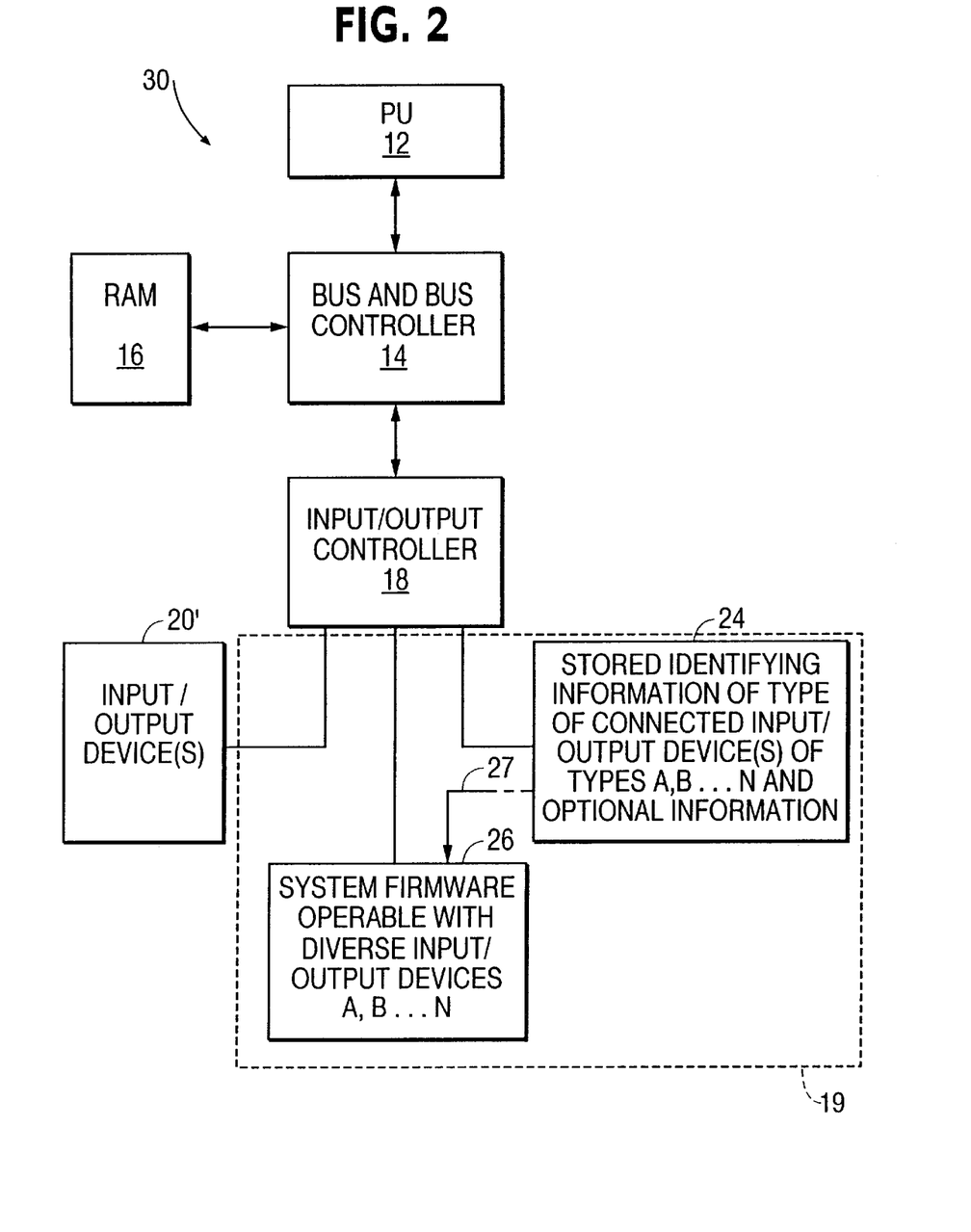
FIG. 2 illustrates an example block diagram of an example processing system in accordance with the present invention.

As a result of such disadvantages, it is desirable for hardware manufacturers, e.g., manufacturers of I/O device (s) 20,' to avoid having installation of their devices require substantial user work in providing/updating system firmware 22. FIG. 2 illustrates an example embodiment of an example processing system 30 in accordance with the present invention, which mitigates or obviates work in providing/updating firmware. The PU 12, bus and bus controller 14, RAM 16, I/O controller 18, and I/O device(s) 20', may be the same as those of FIG. 1, and accordingly redundant description thereof is omitted herein for sake of brevity. Instead, discussion turns to a first example firmware and/or I/O hardware arrangement useable in the example embodiment of the present invention.

Figure 3:
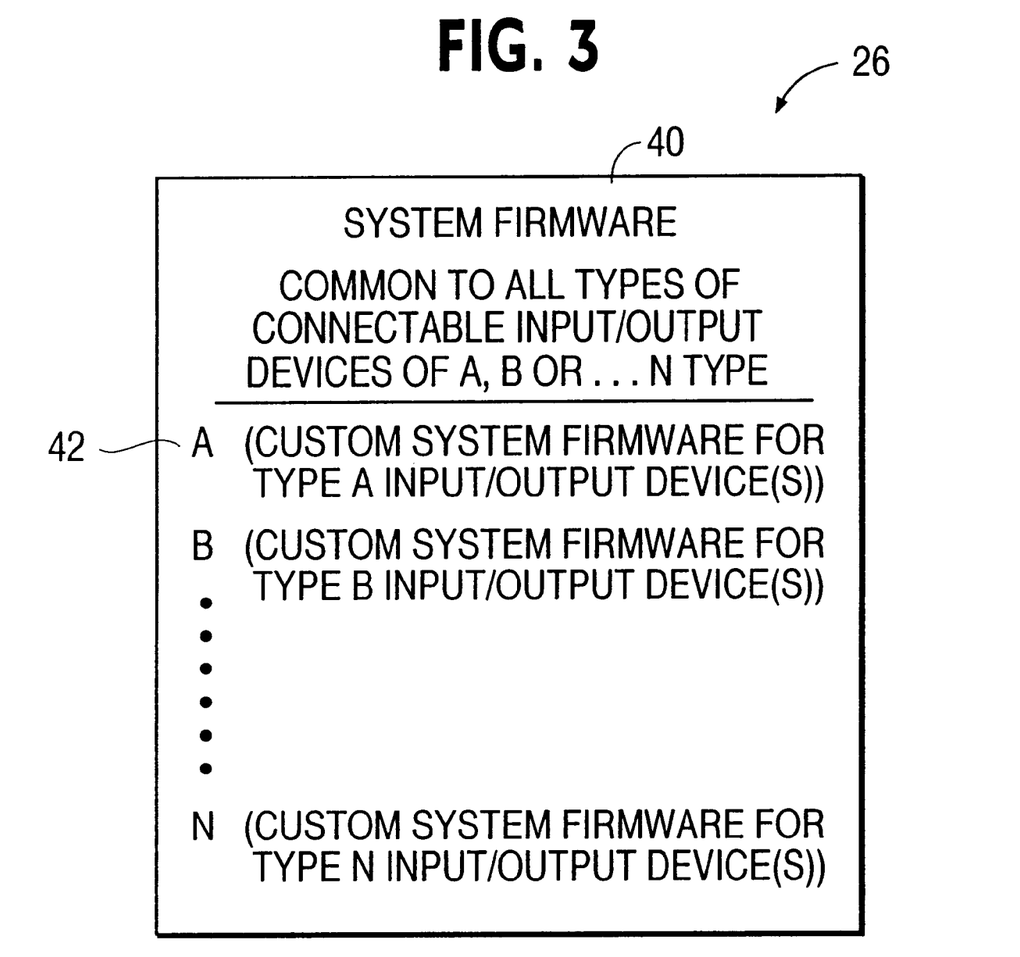
FIG. 3 illustrates an example block diagram of an example embodiment of system firmware which may be utilized in FIG. 2.

More particularly, in the practice of differing hardware configurations (e.g., differing I/O devices), some firmware portions may be mutually useable in common for all (or for at least a portion of) the differing configurations, while other respective firmware portions may each be customized for use with one or several of the respective differing configurations (while not being used with others). Accordingly, FIG. 3 represents an example embodiment of a system firmware 26, having a modular firmware layout which accommodates (i.e., provides) both common firmware portions and customized firmware portions in differing accessible areas. More particularly, area 40 stores common firmware portions, whereas area 42 stores a plurality of customized firmware portions for a plurality of hardware types. For example, area 42 may contain custom firmware portion A which supports functionality/operation of type A I/O device(s), custom firmware portion B which supports functionality/operation of type B I/O device(s), . . . and custom firmware portion N which supports functionality/operation of type N I/O device(s). Each customized firmware portion may be provided in a differing sub-area of the area 42, and may be accessed and executed separately from all of the other customized firmware portions. Again, embodiments of the present invention are not limited in that N can be of any number of custom firmware portions, although an available storage capacity size and/or financial cost allotted to the system firmware 26 may be somewhat prohibitive.

The system firmware 26, which is coupled to the I/O controller, may be stored in a storage device of the non-volatile type such as a FLASH memory, but embodiments of the present invention are not limited thereto. Instead the system firmware 26 may alternatively be stored in a read-only memory (ROM), non-volatile RAM (NVRAM), hard-disk (HD), etc.

Turning now to further elaboration of the system firmware 26, the common firmware portions within area 40 may be accessed and executed upon every system initialization (e.g., before access/execution of any customized firmware portions), irrespective of which type of I/O device(s) 20' (or 20) is coupled within the system configuration. In contrast, only a selected one or ones of the customized firmware portions within area 42 may be executed upon system initialization (e.g., after access/execution of the common firmware portions). More specifically, embodiments of the present invention have arrangements which determine (e.g., during initialization) which particular type(s) of I/O device (s) 20' (or 20) are installed within the system configuration, and utilize such information to access and execute the one or ones of the customized firmware portions corresponding to (i.e., required for use with) the type(s) of I/O device(s) 20' (or 20) installed in the system. As one example of the selective utilization of the custom firmware, if at least one (i.e., one or more) of the installed I/O device(s) 20' is a B type I/O device, then a B customized system firmware portion would be accessed and executed during system initialization.

Figure 7:
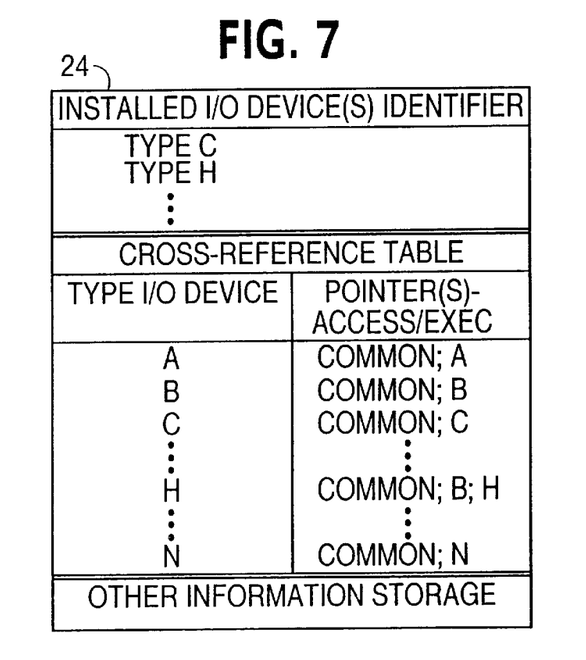
FIG. 7 illustrates an example block diagram of an example table useable with the embodiment of FIG. 2.

Returning to FIG. 2, discussion turns next to example storage 24, with example details of storage 24 being shown in FIG. 7. More particularly, in one example embodiment, the storage 24 stores identifying information which identifies the type(s) of hardware (e.g., I/O device(s) 20' or 20) installed within the processing system and identifies the firmware portions which should be executed, i.e., the processing system may access the storage (e.g., during initialization) to determine which custom firmware portions should be accessed and executed. The identifying information may stored in an "Installed I/O Device(s) Identifier" area of the storage 24 through any suitable process. For example, an original processing system manufacturer may store such identifying information within the storage 24 once the processing system has been finally configured with I/O device(s) immediately before shipment/delivery. The FIG. 7 example illustrates type C and type H I/O devices being indicated as being installed within the processing system.

The storage 24 may additionally have a cross-reference table for using the identifying information to determine which one(s) of the custom firmware portions should be executed for each differing type of possible I/O devices. More particularly, the FIG. 7 example illustrates a "Cross-Reference Table" having entries designating differing possible types of I/O devices in a "Type I/O Device" column, and further pointer entries (e.g., unique IDs or addresses) in a "Pointer(s)—Access/Exec." column designating corresponding firmware portions which should be accessed/executed. Note that for installed type C I/O device(s), corresponding pointers (also represented figuratively by the FIG. 2 long/short dashed arrow 27) indicate that the common firmware portions and C custom firmware portions should be accessed and executed. For installed type H I/O device(s), the pointers indicate that the common firmware portions and both the B and H custom firmware portions should be accessed and executed. Note that the type H example shows that multiple custom firmware portions may be accessed and executed for some types of I/O devices.

More particularly, the type H example shows that the custom firmware portions are not limited for use only with their own designated type of I/O device(s). As a differing example of overlapping use of the custom firmware portions, the custom firmware portions for the differing types of I/O device(s) may be arranged in a predetermined order, and then both a custom firmware portion corresponding to an installed I/O device(s) and all lower ordered custom firmware portions may be cumulatively be used by the system to support an installed I/O device(s). For example, if the custom firmware portions are arranged in the alphabetical order of A, B, C, . . . N, and a type C I/O device(s) is installed, then the system would cumulatively access and execute all of the A, B and C custom firmware portions. In contrast, if a type B I/O device(s) is installed, then the system would cumulatively access and execute only the A and B custom firmware portions.

During initialization, for example, execution of the common firmware portions by the processor accesses the identifying information stored in the storage 24, and thereafter accesses and executes corresponding customized firmware portions identified by the identifying information in storage 24. The system firmware 26 and storage 24 may be collectively viewed as firmware component(s) 19 as shown by the dashed rectangle in FIG. 2, and may be provided via a plurality of separate discrete storage components or as differing storage areas within a singular storage component. Further, the system firmware may at least partially include a basic I/O system (BIOS).

The storage 24 may also provide additional optional information which is used by the system 30 during operation of the processor 12 and which is accessed when the system is reset. The additional information may be of diverse types and provide mechanisms for supporting different types of system operation as follows. For example, the additional information: may relate to a chipset used by the I/O controller 18 which is used by the processor 12 during operation of the system 30; may be code used by the system 30 during operation of the processor or code used by the bus controller; may encode system responses to system state changes, such as, but not limited to, the system stopping or continuing upon error conditions; may be code modules which support the functioning of hardware coupled to the I/O controller 18 or data identifying information pertaining to the operation of the I/O system; may be wiring information regarding the configuration of the I/O controller, such as expansion slots, interruption lines to expansion slots, and error signals. If the additional information is code used by the bus controller, this code may configure the I/O controller to perform particular functions of the I/O system.

Figure 4:
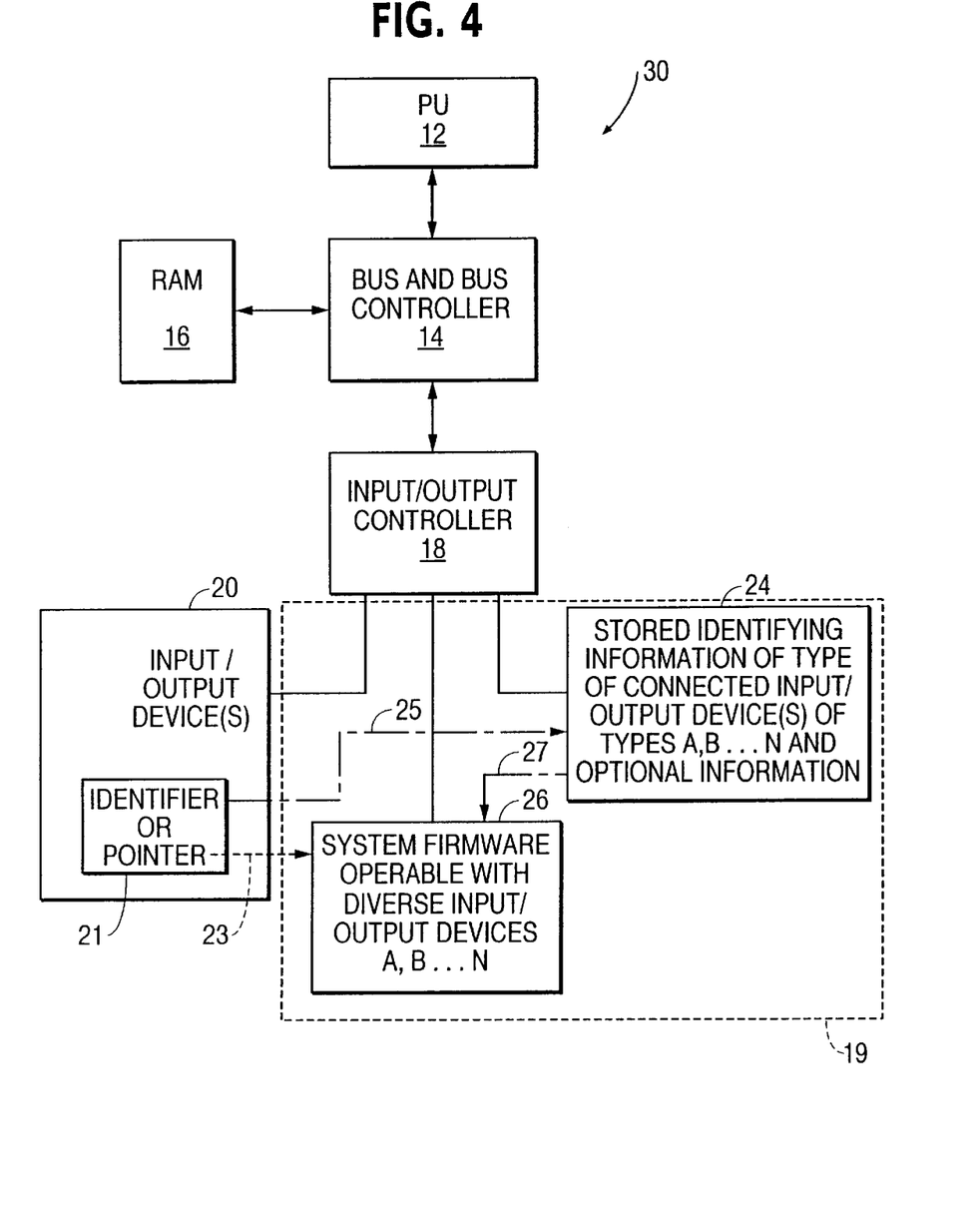
FIG. 4 illustrates an example block diagram of an example processing system in accordance with the present invention.

Discussion turns next to FIG. 4 which illustrates other example embodiments of the present invention. More particularly, FIG. 4 is similar to FIG. 2, except that FIG. 4 shows two additional example approaches for accessing and executing proper firmware portions within system firmware 26. As a first example arrangement, instead of utilizing the "Installed I/O Device(s) Identifier" area of the storage 24, one or more of the installed I/O device(s) may itself alternatively contain and provide an identifier. More particularly, such identifier may be stored in any suitable storage 21 (e.g., ROM) on the I/O device(s) 20, and may be supplied (represented figuratively by the FIG. 4 long/short dashed arrow 25) to the storage 24. More specifically, such identifier may be supplied from storage 21 to storage 24 at occurrence of a next succeeding initialization process after the I/O device(s) 20 has been installed, and may also thereafter be stored within the "Installed I/O Device(s) Identifier" area of the storage 24. Alternatively, such identifier may be supplied from storage 21 to storage 24 at every occurrence of the initialization process. The identifier is used to access the "Cross-Reference Area" for corresponding pointers, and then the pointers are again used to access and execute appropriate firmware to support the installed I/O device(s) 20.

Turning now to another alternative FIG. 4 embodiment, instead of utilizing any of the "Installed I/O Device(s) Identifier" area of the storage 24, the "Cross-Reference Area" or the identifier within the I/O device(s) 20, one or more of the installed I/O device(s) 20 may alternatively itself contain a pointer(s). Such pointer(s) may be stored in any suitable storage 21 (e.g., ROM) on the I/O device(s) 20, and is supplied (represented figuratively by the FIG. 4 dotted arrow 23) to the system firmware 26. More specifically, such pointer may be supplied from storage 21 to system firmware 26 at every occurrence of the initialization process, and used to access and execute appropriate firmware to support the installed I/O device(s) 20.

The example FIGS. 2 and 4 embodiments are advantageous in that they allow generic system firmware 26 and storage 24 components to be mass produced and/or generically programmed with universal common firmware portions, custom firmware portions and "Cross-Reference Table" which can versatilely accommodate all presently known (e.g., as of the date of manufacture) hardware components (e.g., I/O device(s) 20' or 20). Further, if the firmware 26 and storage 24 components are provided as a FLASH memory component(s), such can be arranged to be easily reprogrammed and upgraded (e.g., via Internet and/or disk firmware downloading) to support any later generation I/O device(s).

Figure 5:
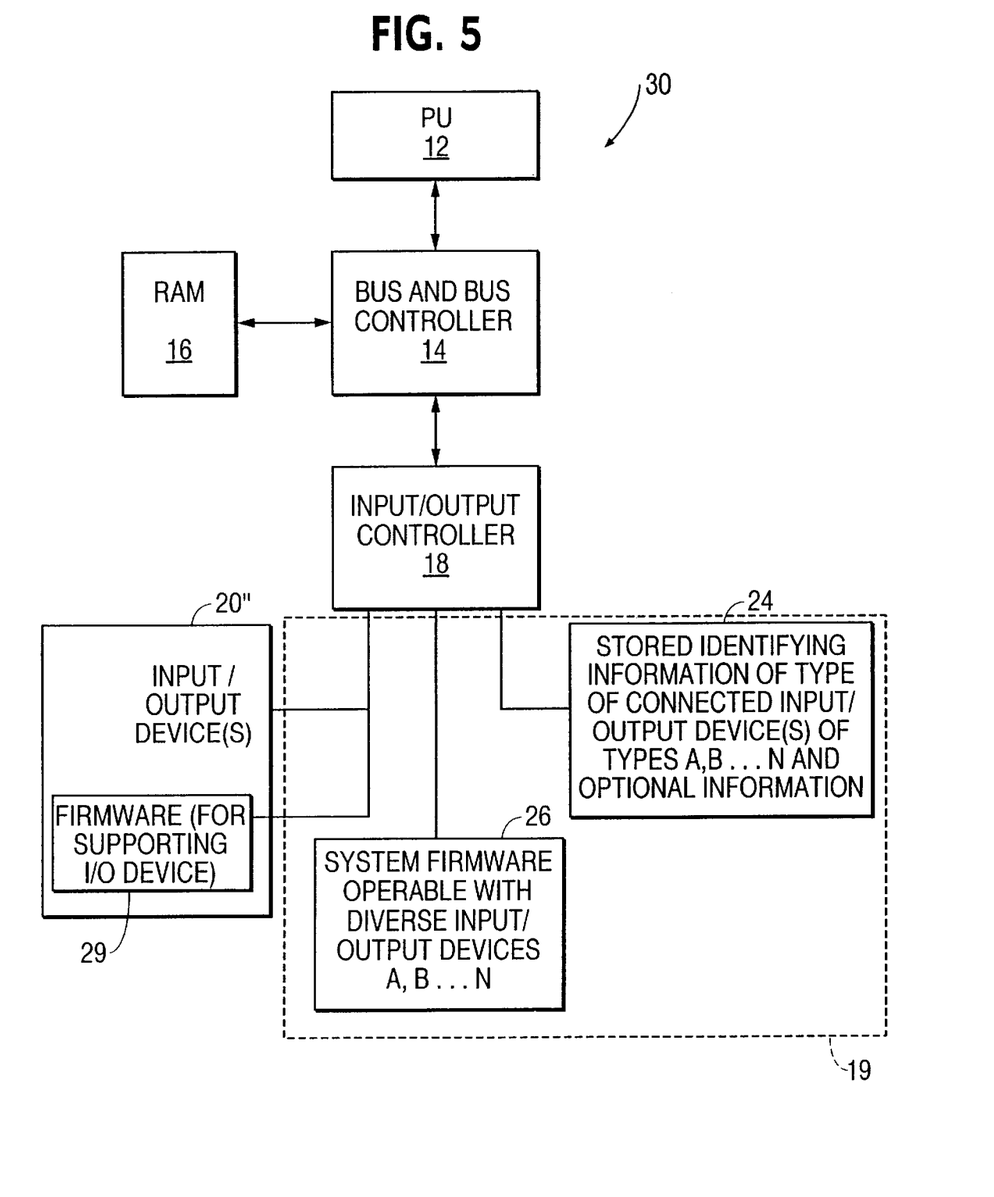
FIG. 5 illustrates an example block diagram of an example processing system in accordance with the present invention.

FIG. 5 is another example embodiment of the present invention. More particularly, the FIG. 5 example embodiment is advantageous in situations where, for example, the system firmware 26 and/or storage are firmware inadequate for (become outdated and/or do not support) a particular (e.g., next generation) I/O device(s) 20". The FIG. 5 embodiment, at minimum, is different from the FIGS. 2 and 4 embodiments in that the FIG. 5 I/O device(s) 20" uses on-board storage 29 which stores and supplies its own custom firmware and or other data (rather than using pre-existing custom firmware and data within the system firmware 26 and storage 24).

More specifically, such on-board (i.e., "owned") custom firmware and data may be supplied from storage 29 (e.g., to the system) at occurrence of a next succeeding initialization process after the I/O device(s) 20" has been installed, and such owned custom firmware and data may thereafter be stored in an appropriate storage(s) in the system (e.g., added to the system firmware 26 and/or storage 24). Alternatively, such owned custom firmware and data may be supplied from storage 29 to the system at every occurrence of the initialization process. Such embodiment is advantageous in that it mitigates or obviates any firmware updating work required of a user, while allowing the system to accommodate and/or update to unknown and/or next generation hardware (e.g., I/O device(s) 20").

Figure 6:
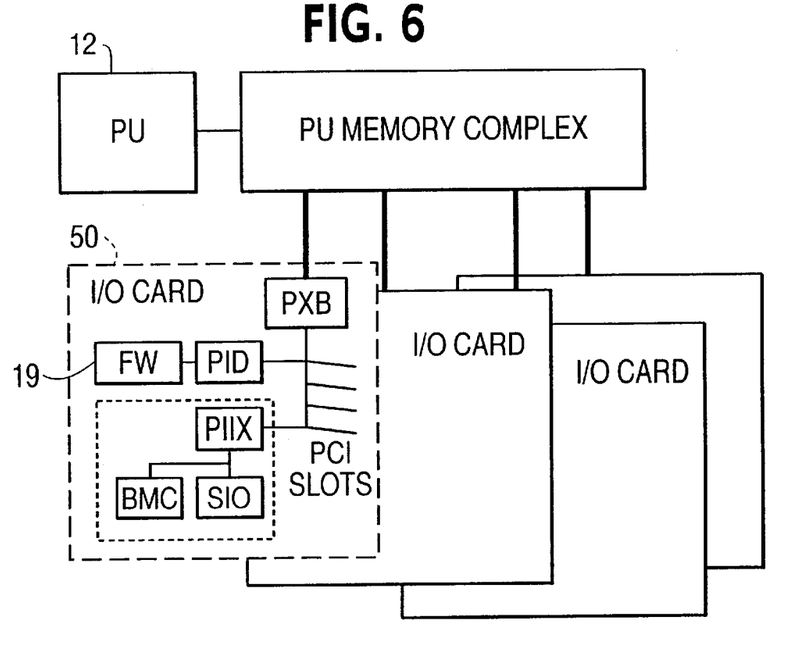
FIG. 6 illustrates an example block diagram of yet another example processing system in accordance with the present invention.

Embodiments of the present invention are applicable to not only personal computers (PCs), but to other processing systems such as servers. For example, the FIG. 6 example embodiment shows an arrangement of a plurality of I/O cards 50, each having the firmware component(s) 19 and being coupled to a PU memory complex. The plurality of memory cards 50 may have additional components such as a Programmable Interrupt Device (PID), Super I/O (SIO) and provide I/O slots. The firmware component(s) 19 may be a non-volatile random access memory (NVRAM) or any other non-volatile storage. Further, the firmware component(s) 19 may be part of the hardware platform, and may define all platform specific information about the hardware. Such allows a standard BIOS to understand and program the new hardware without requiring user customizations. As yet more examples the firmware component(s) 19 may contain standardized binary code modules and data structures, so the firmware component(s) 19 may be implemented as hardware independent of a BIOS. Still further, the firmware component(s) 19 may contain binary code to interface to server management hardware, to support on-board PCI device option ROMs, and any other code that is required to make the system modular. Finally, the firmware component(s) may also contain data such as a number of I/O components in the system.

In addition to the embodiments of the present invention being useful in situations wherein a processor modification is made some time after purchase, a universal or standard firmware which versatilely supports installation of different processors would permit hardware platforms to be assembled without requiring firmware change.

This concludes the description of the preferred embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A system comprising:
    an input/output (I/O) system,
    system firmware including a common firmware part and a plurality of firmware parts, the common firmware part providing at least one system firmware function mutually used in common for different types of connectable I/O devices, each firmware part of the plurality of firmware parts to operate to perform system firmware functions customized to at least one type of connectable I/O device, wherein the common firmware part executing upon system initialization, and
    an identifier adapted to store identifying information which identifies at least one installed I/O device, the identifying information directing execution of at least one firmware part of the system firmware during firmware initialization to implement a system firmware function to operate the at least one installed I/O device, wherein only a selected one or ones of the plurality of firmware parts executing upon system initialization.

2. A system in accordance with claim 1 wherein:
    the system firmware includes the common firmware part which performs system firmware functions implemented in common for all connectable I/O devices.

3. A system in accordance with claim 2 wherein:
    the common firmware part of the system firmware accesses the identifying information when the system is initialized, and a processor executes the common firmware part and the at least one firmware part of the system firmware identified by the identifying information for the at least one installed I/O device.

4. A system in accordance with claim 3 further comprising:
    a bus controller coupled to a processor and to the I/O system, and wherein the system firmware is coupled to the I/O system.

5. A system in accordance with claim 2 further comprising:
    a bus controller coupled to a processor and to the I/O system, and wherein the system firmware is coupled to the I/O system.

6. A system in accordance with claim 1 wherein:
    the identifying information is accessed when the system is initialized.

7. A system in accordance with claim 6 further comprising:
    a bus controller coupled to a processor and to the I/O system, and wherein the system firmware is coupled to the I/O system.

8. A system in accordance with claim 1 further comprising:
    a bus controller coupled to a processor and to the I/O system, and wherein the system firmware is coupled to the I/O system.

9. A system in accordance with claim 1, comprising:
    a processor; and
    a storage which further stores additional information used by the system during operation of the processor which is accessed when the system is initialized.

10. A system in accordance with claim 9 wherein the additional information comprises:
    information relating to a chipset used in the coupled I/O system which is utilized by the processor during operation of the system.

11. A system in accordance with claim 9 wherein:
    the storage stores additional information used by the system comprising code used by the system during operation of the processor.

12. A system in accordance with claim 9 further comprising:
    a bus controller coupled to the coupled I/O system; and wherein
    the additional information is code used by the bus controller.

13. A system in accordance with claim 9 wherein:
    the additional information comprises system responses to system state changes.

14. A system in accordance with claim 1, comprising:
    a storage which contains code modules which support functioning of hardware coupled to the I/O system.

15. A system in accordance with claim 1, comprising:
    a storage which contains data identifying information pertaining to operation of the I/O system coupled to the system.

16. A system in accordance with claim 1 wherein:
    the system firmware includes a BIOS.

17. A method of operating a system including a processor and of a plurality of different input/output (I/O) systems each operable with a customized system firmware, said method comprising:
    providing a system firmware, including a common firmware part and a plurality of firmware parts, the common firmware part providing at least one system firmware function mutually used in common for different types of connectable I/O systems, each firmware part of the plurality of firmware parts to operate to perform system firmware functions customized to only a subset of connectable I/O systems, wherein the common firmware part executing upon system initialization;
    providing a storage coupled to the system to store identifying information to identify a coupled subset of the connectable I/O systems, which identifying information is useable to implement at least one firmware part to operate the system with the system firmware customized to the coupled subset of the connectable I/O systems; and
    providing an arrangement to read the identifying information and execute the at least one firmware part within the system firmware during firmware initialization to implement the system with the system firmware customized to the coupled subset of the connectable I/O systems, wherein only a selected one or ones of the plurality of firmware parts executing upon system initialization.

18. A method in accordance with claim 17 wherein:
    the system firmware includes the common firmware part which performs system firmware functions for all the connectable I/O systems.

19. A method in accordance with claim 18 wherein:

the common firmware part of the system firmware accesses the identifying information when the system is turned on, and the processor executes the common firmware part and the at least one firmware part identified by identifying information for the coupled subset of the connectable I/O systems.

20. A method in accordance with claim 17 wherein:

the storage further stores additional information used by the system during operation of the processor which is accessed when the system is initialized.

21. A method in accordance with claim 20 wherein:

the storage stores additional information relating to a chipset used in the coupled subset which is utilized by the processor during operation of the system.

22. A method in accordance with claim 17 wherein:

the storage stores additional information used by the system comprising code used by the system during operation of the processor.

23. A method in accordance with claim 22 further comprising:

a bus controller coupled to the coupled subset; and wherein the additional information is code used by the bus controller.

24. A method in accordance with claim 22 wherein:

the additional information comprises system responses to system state changes.

25. A method in accordance with claim 17 wherein:

the system firmware includes a BIOS.

26. A method of customizing a processing system during firmware initialization to operate with connectable I/O systems each operable with a customized system firmware, the method comprising:

providing the processing system with a system firmware containing common firmware code and a plurality of customized firmware code which, when selected, supports operation of each of the connectable I/O systems, the common firmware part providing at least one system firmware function mutually used in common for different types of the connectable I/O systems; and providing each of the I/O systems with stored identifying information which, when each I/O system is individually coupled to the processing system, is read by the processing system during firmware initialization causing the processing system to execute at least one firmware part code within the system firmware during firmware initialization to support operation customized to the coupled I/O system, wherein only a selected one or ones of the plurality of customized firmware code executing upon system initialization.

27. A method in accordance with claim 26 wherein:

the system firmware includes a BIOS.

* * * * *